V. M. HARRIS.

MANUFACTURE OF CYLINDRICAL PHONOGRAPH RECORD BLANKS.

APPLICATION FILED OCT. 8 1908.

Reissued Jan. 4, 1910.

13,067.

Attest:

J. C. Turner

Jno. F. Oberlin

Inventor:

Varian M. Harris by J. B. Fay

Attorney.

UNITED STATES PATENT OFFICE.

VARIAN M. HARRIS, OF CHICAGO, ILLINOIS, ASSIGNOR, BY MESNE ASSIGNMENTS, TO THE CLEVELAND PHONOGRAPH RECORD COMPANY, OF CLEVELAND, OHIO, A CORPORATION OF OHIO.

MANUFACTURE OF CYLINDRICAL PHONOGRAPH RECORD-BLANKS.

13,067. Specification of Reissued Letters Patent. Reissued Jan. 4, 1910.

Original No. 854,886, dated May 28, 1907, Serial No. 338,727. Application for reissue filed October 8, 1908. Serial No. 456,847.

*To all whom it may concern:*

Be it known that I, VARIAN M. HARRIS, a citizen of the United States of America and a resident of Chicago, in the county of Cook and State of Illinois, have invented certain new and useful Improvements in the Manufacture of Cylindrical Phonograph Record-Blanks, of which the following is a specification.

This invention relates to means for forming cylindrical phonograph record blanks from sheets of celluloid and has for its object to provide a simple and efficient structural arrangement and combination of parts whereby the sheet of material bent into cylindrical form is securely held and united by a longitudinally extending cemented seam to form a cylindrical blank equal in all respects to the drawn tubes or cylinders heretofore used in the manufacture of phonograph records, all as will hereinafter more fully appear.

Figure 1:
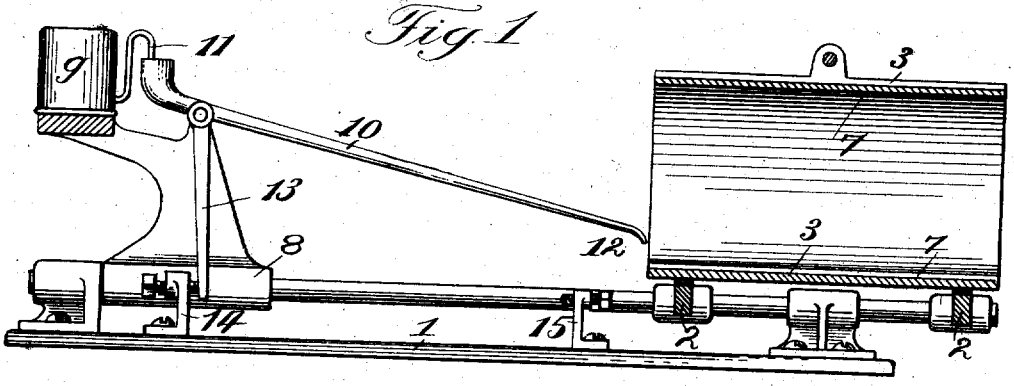
Figure 2:
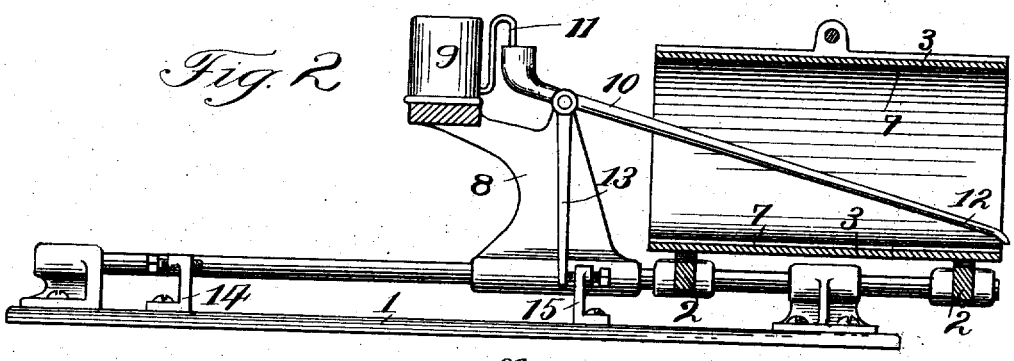
Figure 3:
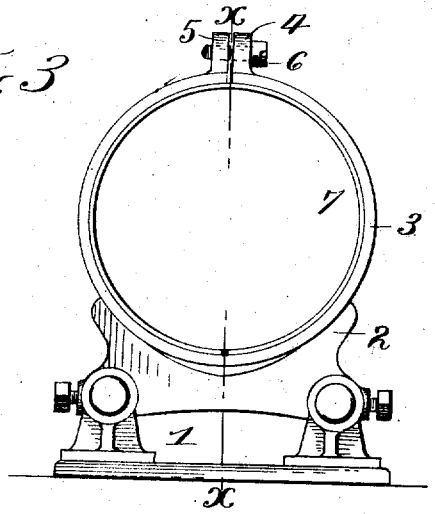

In the accompanying drawings:—Figure 1 is a longitudinal sectional elevation, on line $x$—$x$, Fig. 3, of an apparatus embodying the present invention, and showing the parts in the position in which the carriage has completed an active stroke. Fig. 2 is a similar view showing the parts in the position for the commencement of an active stroke. Fig. 3 is an enlarged end elevation.

Similar numerals of reference indicate like parts in the different views.

Referring to the drawings, 1 represents a stationary slideway of any usual construction, and provided with suitable feet by which it is supported in a horizontal position upon a work bench or table.

2 are a plurality of saddle pieces secured in fixed relation to the slideway 1, and adapted to support the cylindrical work holder in proper position in the apparatus.

3 is the cylindrical work holder above referred to, and consisting of a cylindrical shell of metal, or other equivalent material, slitted along its length to form the longitudinal opening or gap 4 in the wall of the holder as shown.

5 are ears upon the opposed edges of the gap 4, through which pass adjusting screws 6, by which an adjustment in the diameter of the holder can be effected as required in the actual and continued use of the apparatus. The work holder 3 is so constructed as to possess a sufficient degree of resiliency to allow such adjustment to be made.

7 is the sheet of celluloid to be operated on, and which is bent into a cylindrical form and inserted into the interior of the cylindrical holder 3, with the meeting edges and seam formed thereby, located at the under side of the blank celluloid cylinder so formed, and as shown more particularly in Fig. 3.

8 is a carriage sliding longitudinally on the slideway 1, and carrying a supply tank 9 in which is contained a supply of the cementing fluid used in the practical operation of the apparatus, and which fluid will usually consist of a cellulose product dissolved in ether.

10 is a fountain pen pivotally supported on the carriage 8, and having one end connected by a flexible tube 11, with the supply tank 9, while its other end is of an elongated form and ends in a capillary discharge point 12 through which the cementing fluid flows, as said point moves in contact with the work.

13 is a depending operating arm rigidly connected to the fountain pen 10, aforesaid.

14 and 15 are stationary stops arranged near the limit of the longitudinal travel of the carriage 9, in each direction, and which are adapted to alternately contact with the arm 13 to raise the discharge point 12 from the work, at the ending of its active stroke, and in like manner depress said discharge point at the ending of its inactive stroke; such operations taking place in an automatic manner during a continued operation of the apparatus.

The operation of the apparatus is as follows:—A sheet of celluloid of the proper dimensions is bent into a cylindrical form and inserted in the interior of the cylindrical work holder 3, which is adjusted to the required diameter by the adjusting screws 6. The work holder is then placed in position on the saddle pieces 2, with the seam of the celluloid cylinder located at the lowermost point in the height of said cylinder as shown. The operator now moves the carriage 8 to bring the discharge point 12 of the fountain pen 10 to the rear end of the interior of the work and work holder, as illustrated in Fig. 2, and as such position is reached the stop 15 contacts with the arm 13 to automatically depress the discharge point 12 to an operative position. A return movement is now imparted to the carriage and the discharge point 12 is drawn along the longitudinal seam of the celluloid cylinder 7 to deposit the cementing solution; with the ending of such active or return stroke of the carriage, the stop 14 contacts with the arm 13 to automatically raise the discharge point 12 into its normal inoperative position. The work holder with its contained cylinder of celluloid, is now removed from the apparatus and stacked away to dry out, and is replaced by a succeeding holder and its contained sheet of celluloid, the system requiring a large number of counterpart work holders in the attainment of rapid and perfect work.

Having thus fully described my invention, what I claim as new and desire to secure by Letters Patent, is:—

1. In apparatus of the class described, a work holder comprising a one-piece cylindrical shell of resilient material slitted along its length to form a longitudinal opening in the shell wall, and means for drawing the edges of such opening more or less closely together to vary the diameter of said shell.

2. In apparatus of the class described, a work holder comprising a one-piece cylindrical shell of resilient material slitted along its length to form a longitudinal opening in the shell wall, ears upon the edges of such opening, and adjusting screws passing through such ears whereby such edges may be drawn more or less closely together to vary the diameter of said shell.

3. In apparatus of the class described, the combination with a horizontally disposed work holder adapted to maintain a sheet of celluloid in a cylindrical form; of a liquid supply member adapted to be inserted within said holder, and means for supporting said member, said holder and means being relatively movable, whereby the member may be drawn longitudinally along the holder.

4. In apparatus of the class described, the combination with a horizontally disposed work holder adapted to maintain a sheet of celluloid in a cylindrical form, such sheet having its edges abutting along the lower side of said shell; of a fountain pen adapted to be inserted within said shell, and to contact with the abutting edges of the sheet therein, and means for supporting said fountain pen, said means being movable longitudinally of said shell.

5. In apparatus of the class described, the combination with a horizontally disposed work holder adapted to maintain a sheet of celluloid in cylindrical form, such sheet having its edges abutting along the lower side of the said shell; of a fountain pen adapted to be inserted within said shell and to contact with the abutting edges of the sheet therein, means for supporting said pen, said means being movable longitudinally of said shell and said pen being movable into and out of contact with such sheet's edges.

6. In apparatus of the class described, the combination with a horizontally disposed work holder adapted to maintain a sheet of celluloid in substantially cylindrical form, of means for guiding a member longitudinally along said holder.

7. In apparatus of the class described, the combination with a horizontally disposed work holder adapted to maintain a sheet of celluloid in substantially cylindrical form, such sheet having its edges abutting along the lower side of said cylinder, of means for guiding a member along such abutting edges.

8. In apparatus of the class described, the combination with a horizontally disposed work holder adapted to maintain a sheet of celluloid in substantially cylindrical form, of a liquid supply member adapted to be inserted within said holder, said holder and member being relatively movable whereby the member may be drawn longitudinally along the holder, and means for guiding said member.

9. In apparatus of the class described, the combination with a horizontally disposed work holder adapted to maintain a sheet of celluloid in substantially cylindrical form, such sheet having its edges abutting along the lower side of said cylinder, of a fountain pen adapted to be inserted within said holder, and to contact with the abutting edges of the sheet therein, said pen being movable longitudinally of said holder, and means for so guiding said pen.

10. In apparatus of the class described, the combination with a horizontally disposed work holder adapted to maintain a sheet of celluloid in substantially cylindrical form, such sheet having its edges abutting along the lower side of said cylinder, of a fountain pen adapted to be inserted within said holder and to contact with the abutting edges of the sheet therein, said pen being movable both longitudinally of said holder, and into and out of contact with such sheet's edges, and means for so guiding said pen.

11. In apparatus of the class described, the combination with a horizontally disposed work holder adapted to maintain a sheet of celluloid in cylindrical form, such sheet having its edges abutting along the lower side of the said shell; of a fountain pen adapted to be inserted within said shell and to contact with the abutting edges of the sheet therein, said pen being movable longitudinally of said shell; and means adapted to automatically move said pen into and out of contact with such sheet's edges incidentally to the longitudinal movement of said pen.

12. In an apparatus for forming sheet celluloid into cylindrical phonograph record blanks, the combination of a cylindrical work holder adapted to maintain a sheet of celluloid in a cylindrical form, means for supporting the work holder in a horizontal position a slideway arranged longitudinally to the work holder, a carriage moving on said slideway, and a fountain pen carried by said carriage.

13. In an apparatus for forming sheet celluloid into cylindrical phonograph record blanks, the combination of a longitudinally slotted cylindrical work holder adapted to maintain a sheet of celluloid in a cylindrical form, means for effecting a change in the diameter of said work holder, means for supporting the work holder in a horizontal position, a slideway arranged longitudinally to the work holder, a carriage moving on said slideway, and a fountain pen carried by said carriage.

14. In an apparatus for forming sheet celluloid into cylindrical phonograph record blanks, the combination of a cylindrical work holder adapted to maintain a sheet of celluloid in a cylindrical form, stationary saddle pieces for supporting the work holder in a horizontal position, a slideway arranged longitudinally to the work holder, a carriage moving on said slideway, and a fountain pen carried by said carriage.

15. In an apparatus for forming sheet celluloid into cylindrical phonograph record blanks, the combination of a longitudinally slotted cylindrical work holder adapted to maintain a sheet of celluloid in a cylindrical form, stationary saddle pieces for supporting the work holder in a horizontal position, a slideway arranged longitudinally to the work holder a carriage moving on said slideway, and a fountain pen carried by said carriage.

16. In an apparatus for forming sheet celluloid into cylindrical phonograph record blanks, the combination of a cylindrical work holder adapted to maintain a sheet of celluloid in a cylindrical form, means for supporting the work holder in a horizontal position, a slideway arranged longitudinally to the work holder, a carriage moving on said slideway, a supply tank on said carriage, a pivoted fountain pen carried by said carriage connected with said tank, and means for tilting said pen near the ends of its travel.

17. In an apparatus for forming sheet celluloid into cylindrical phonograph record blanks, the combination of a longitudinally slotted cylindrical work holder adapted to maintain a sheet of celluloid in a cylindrical form, means for effecting a change in the diameter of said work holder, means for supporting the work holder in a horizontal position, a slideway arranged longitudinally to the work holder, a carriage moving on said slideway, a supply tank on said carriage, a pivoted fountain pen carried by said carriage and connected with said tank, and means for tilting said pen near the ends of its travel.

Signed by me this 6th day of October, 1908.

VARIAN M. HARRIS.

Attested by—
CHRISTINE E. ARNS,
JNO. F. OBERLIN.